Dec. 8, 1953

J. W. LEIGHTON 2,661,524

FORM CUTTING TOOL

Filed Jan. 12, 1951

INVENTOR.
John W. Leighton.
BY
Harness, Dickey & Pierce
ATTORNEYS.

Patented Dec. 8, 1953

2,661,524

UNITED STATES PATENT OFFICE 2,661,524

FORM CUTTING TOOL

John W. Leighton, Port Huron, Mich.

Application January 12, 1951, Serial No. 205,677

2 Claims. (Cl. 29—95)

The present invention relates to cutting tools, particularly to form tools for use in screw machines and analogous machine tools.

So-called flat form cutters have heretofore commonly been constructed in the shape of a generally rectangular hexahedral block, having a formed cutting surface defining one face of the hexahedron, while a dovetailed supporting portion is carried by or adjacent the side of the block opposite to said formed cutting surface. The dovetailed portion is adapted to be gripped in a tool holder on the machine, and one corner at an end of the formed surface constitutes the cutting edge. The form of the block is modified, in sharpening the same, by grinding off at a suitable angle, termed the rake angle, the end whose juncture with the formed surface defines the cutting edge. The rake angle may be of the order of 5 to 10 degrees when cutting many common materials including most steels. Each sharpening of such a tool shortens the effective holding or gripping length of the dovetailed portion and decreases the strength of the tool. Since accurate workmanship requires rigid support of the cutting edge of the tool, it is frequently impossible to grind away more than about one-third of the length of such a tool of the conventional type before it is necessary to discard it.

My improved cutting tool may be made exactly the same in transverse cross section as the conventional type of flat form tool referred to above, but its shape is substantially that of a parallelepiped, wherein the longitudinal sides of the block are approximate parallelograms, with the ends of the block so slanted that the dovetailed supporting portion lies considerably behind or farther from the work than the cutting edge. The angularity of the front end face of my improved cutter is made as great as it is possible to employ without causing chattering of the cutter, and is always substantially greater than the rake angle. (The rake modifies the form of the cutting edge face.) My improved cutter possesses the important advantage of retaining its rigidity throughout many more sharpenings than are possible with conventional cutters, despite the fact that my improved cutter is no more expensive to construct than conventional cutters.

The foregoing constitutes a summary of my invention and its nature and substance, and also indicates its principal objects and advantages. Other objects which I have sought to achieve include the provision of such a cutter which is adapted to be utilized in standard machine tool holders, without special appurtenances and without modifying the practices employed by machinists. Another object is to provide such an improved flat form cutting tool which can be sharpened successively without disturbing the dimensions of the supporting portions, and which is quicker, easier and cheaper to sharpen.

In summary, it may be said that my prime overall object is to provide such a cutter which is more economical in use, and which involves less wastage of material.

Other objects and advantages will become apparent upon consideration of the present disclosure in its entirety.

Figure 3:
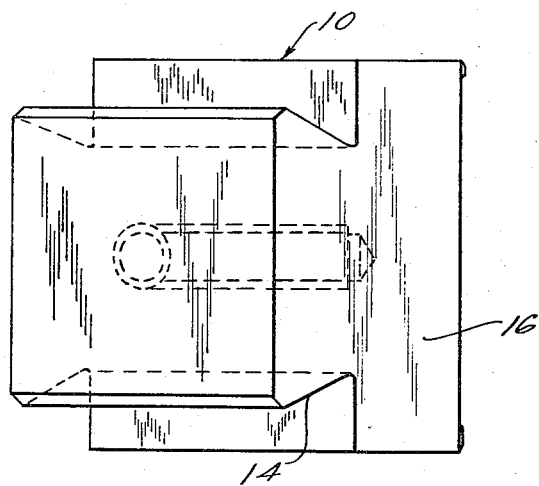
Fig. 3 is a top plan view of the same.
Figure 1:
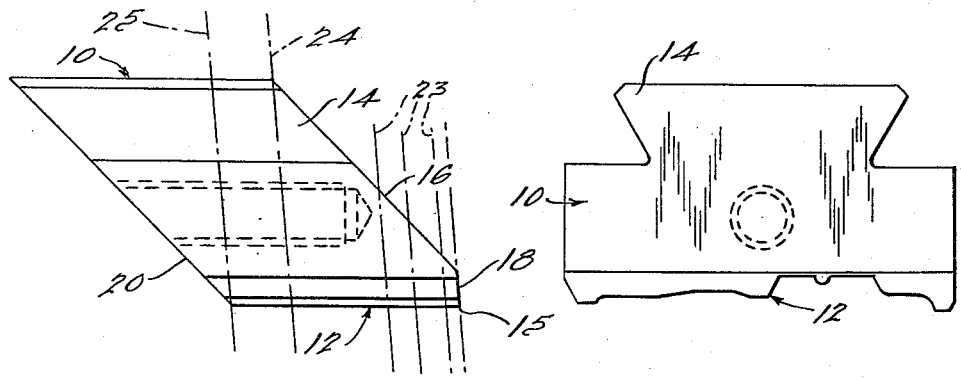
Figure 1 is a side elevational view of a cutter constructed in accordance with the principles of the present invention and diagrammatically indicating the angle at which the cutting edge might be ground away in sharpening.
Figure 2:
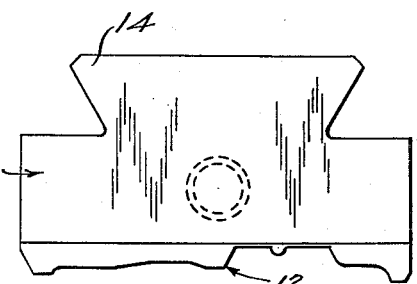
Fig. 2 is an end elevational view of the cutter.

Referring now to the drawing, reference character 10 designates generally the body of a preferred embodiment of my improved cutting tool which, as shown in Fig. 1, is of blocklike form having longitudinal sides which when projected on a plane as in Fig. 1 appear in the approximate form of parallelograms. The face 12 of the block which constitutes the formed surface is indicated as provided with an arbitrary contouring which corresponds to the desired form of the workpiece and which extends longitudinally and rectilinearly of the block, as will be understood. It will also be understood that the illustrated form of such surface is entirely exemplary and would vary in accordance with the desired configuration of the finished work. The dovetailed portion, designated 14, which is adapted to be mounted in the tool holder of the machine in a conventional or any other suitable manner is, as is usual, carried by the face opposite to the formed face, but by reason of the inclination of the front and rear faces of the block the dovetailed holding portion lies a substantial distance to the rear of the front cutting edge of the block when the block is new, as shown in Fig. 1. The cutting edge of the new block illustrated in Fig. 1 is designated 15 and the inclined front face of the block is designated 16. Only a very small proportion of the front face is ground away at the rake angle when the block is new. The face formed by such an initial sharpening is designated 18.

With the preferred arrangement illustrated, it will be seen that about three-fourths of the formed cutting surface 12 can be ground away (to the line 24) before sharpening of the tool causes any shortening of the dovetailed supporting portion 14. When the cutting surface is entirely ground away (to the line 25), three-fourths of the supporting portion remains intact, and the sharp slope of the rear surface 20 assists in rigidly supporting the cutting edge as the last of the cutting edge is used, although ordinarily I only use the cutting surface down to about 1/8" from the end. Of course the proportion of the cutting edge that can be used without shortening the support varies with the rake angle, but under most conditions it is possible to grind away a large proportion of the formed surface before support of the tool becomes so insecure that it must be discarded. Inasmuch as such tools are relatively costly, this represents a very substantial saving in money and material, despite the fact that little or no more work or material is required in the construction of the improved cutter.

The rear end 20 of the block is shown as inclined at the same angle as the front end face 16, but this will be recognized as subject to variation.

It will be apparent that my improved tool can be manufactured in any of various ways, as, for example, by forging, hot upsetting, or by machining bar stock and then cutting a plurality of cutter blocks from the bar.

Sharpening of my improved cutter is quicker and easier throughout most of its life, since less metal is required to be ground away in sharpening, due to the fact that the angle between face 16 and the vertical (in the position of the cutter shown in Fig. 1) is greater than the rake angle. Intermediate planes to which the cutter may be sharpened are illustratively indicated by the broken line 23.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

I claim:

1. A form cutting tool having a formed face upon one side and a supporting portion opposite, and generally parallel, to the formed side, an end of the tool having a surface intersecting the formed face to define a cutting edge and lying at a rake angle and the remainder of said end being inclined at an angle substantially exceeding the rake angle, the side having the formed face being bodily offset with respect to the opposite side in the direction of said end.

2. A block-like form cutting tool having two substantially parallel opposite sides, said sides being longitudinally offset from one another, a holding portion upon one side and extending substantially the full length of said side, and a formed face upon the opposite side, substantially flat longitudinal sides of approximately parallelogram shape connecting said opposite sides, and an end portion of the block located at the end toward which the side carrying the formed face is offset and intersecting said formed face to define a cutting edge.

JOHN W. LEIGHTON.

References Cited in the file of this patent

UNITED STATES PATENTS

| Number | Name | Date |
| --- | --- | --- |
| 56,495 | Grant | July 17, 1866 |
| 491,256 | Cheney | Feb. 7, 1893 |
| 553,802 | Bardons et al. | Jan. 28, 1896 |
| 690,208 | Vanstone | Dec. 31, 1901 |
| 1,223,654 | Allingham | Apr. 24, 1917 |
| 1,959,140 | Peterson | May 15, 1934 |
| 2,373,155 | White | Apr. 10, 1945 |
| 2,377,773 | Francis | June 5, 1945 |
| 2,414,231 | Kraus | Jan. 14, 1947 |
| 2,483,220 | Morrow | Sept. 27, 1949 |